US012686230B2

(12) United States Patent
Turner

(10) Patent No.: US 12,686,230 B2
(45) Date of Patent: **\*Jul. 21, 2026**

(54) TETHER RESTRAINT FOR TRUCK DRIVE WHEELS

(71) Applicant: WheelSafe Technology, Inc., Calumet, OK (US)

(72) Inventor: William Turner, Yukon, OK (US)

(73) Assignee: WheelSafe Technology, Inc., Yukon, OK (US)

( \* ) Notice: Subject to any disclaimer, the term of this patent is extended or adjusted under 35 U.S.C. 154(b) by 683 days.

This patent is subject to a terminal disclaimer.

(21) Appl. No.: 17/993,457

(22) Filed: Nov. 23, 2022

(65) Prior Publication Data

US 2023/0091889 A1 Mar. 23, 2023

Related U.S. Application Data

(63) Continuation-in-part of application No. 16/867,007, filed on May 5, 2020, now Pat. No. 12,128,708.

(51) Int. Cl.
B60B 35/18 (2006.01)
B60B 27/02 (2006.01)
F16C 17/04 (2006.01)

(52) U.S. Cl.
CPC .............. B60B 35/18 (2013.01); B60B 27/02 (2013.01); F16C 17/04 (2013.01); B60B 2320/10 (2013.01); B60B 2900/331 (2013.01); B60B 2900/731 (2013.01)

(58) Field of Classification Search
CPC ... B60B 27/02; B60B 35/18; B60B 2900/331; B60B 2900/3312; B60B 2900/731; F16C 17/04
See application file for complete search history.

(56) References Cited

U.S. PATENT DOCUMENTS

| | | | |
|---|---|---|---|
| 3,486,797 | A | 12/1969 | Osborne |
| 3,944,285 | A | 3/1976 | Vincent |
| 5,560,687 | A | 10/1996 | Jagelthorn |
| 5,795,037 | A | 8/1998 | Hagelthorn |
| 5,954,151 | A | 9/1999 | Cocharane et al. |
| 6,070,893 | A | 6/2000 | Thorndyke et al. |
| 7,000,995 | B2 | 2/2006 | Hagelthom |
| 7,228,932 | B2 | 6/2007 | Rosenthal et al. |
| 7,547,077 | B2 | 6/2009 | Melberg et al. |
| 9,970,486 | B2 | 5/2018 | Hagelthorn |
| 10,987,973 | B2 * | 4/2021 | Turner ................... B60B 35/08 |
| 11,084,324 | B2 * | 8/2021 | Turner ................... B60B 35/04 |

(Continued)

OTHER PUBLICATIONS

Bal Seal; "Solutions for Rotary Applications"; retrieved on Nov. 22, 2022 from https://www.balseal.com/rotary-seal-catalog/.

(Continued)

*Primary Examiner* — Jason R Bellinger
(74) *Attorney, Agent, or Firm* — Dunlap Codding, P.C.

(57) ABSTRACT

A wheel restraint system especially useful for restraining break-away wheels on drive axles and also to trailer axles, having a tether, a cable end component, a thrust bearing, and a wheel retention subassembly which fits over a wheel hub, wherein the tether is secured to the vehicle, such as secured to the inside wall of a hollow axle or through a hollow axle to an opposing similar wheel restraint system.

15 Claims, 12 Drawing Sheets

(56)　　　　　　References Cited

U.S. PATENT DOCUMENTS

| 12,128,708 | B2 * | 10/2024 | Turner | B60B 3/165 |
| 2003/0015909 | A1 | 1/2003 | Meek, Jr. | |

OTHER PUBLICATIONS

Spicer; "Spicer Axle, Driveshaft, and Electrified Systems"; retrieved on Nov. 11, 2022 from https://www.dana.com.

Daniels, Brian; "How to spec the right axle configuration"; Aug. 15, 2019.

Crissey, Alex; "How do my truck's axles integrate with . . . "; Aug. 15, 2019.

Powertelcom; "Home—Earth Anchor—Expanding Rock Anchor"; retrieved Nov. 11, 2022 from https://www.powertelcom.com.

Williams Form Engr.; "B7S Coil All-thread Spin-Lock Rock Bolt"; retrieved on Nov. 11, 2022, from https://www.williamsform.com.

Crosby Group LLC; "Angular Contact Bearing Swivels"; 2017.

ESCO Corp.; "Rigging Products Specifications"; document P7000RIG01L0112.

Hanes Supply Inc.; "Section 3: Wire Rope Assembly and Fittings", pp. 3-A, et seq.

Hendrickson; "Technical Procedure: Trailer suspension systems standard wheel service wheel-end"; Mar. 2018, document LIT No. L496, Revision 1.

Park, Jim; "Keeping your wheels on", Oct. 15, 2013, retrieved Dec. 19, 2018 from https://www.truckinginfo.com.

Monster, R. F.; "Wheel separations from commercial vehicles: Experiences in Ontario", 2004; Proceedings of the Canadian Multidisciplinary Road Safety Conference XIV.

National Transportation Safety Board; "Safety Recommendation", Oct. 23, 1992; retrieved from https://www.ntsb.gov/safety/safety-recs/recletters/H92_98_101.pdf.

GMB; "Wheel bearing parts"; retrieved on Jul. 14, 2019 from https://www.gmb.jp.

\* cited by examiner

TETHER RESTRAINT FOR TRUCK DRIVE WHEELS

This patent application is a continuation-in-part of U.S. patent application Ser. No. 16/867,007, filed on May 5, 2020, now U.S. Pat. No. 12,128,708, which is expressly incorporated herein by reference in its entirety.

FIELD OF THE INVENTION

The present invention generally relates technologies to prevent run-away wheel assemblies after a mechanical failure such as a lug or lug nut failure on a drive wheel of a truck for pulling an over-the-road trailer.

BACKGROUND OF INVENTION

For the purposes of this disclosure, the term "drive axle" shall refer to any of a variety of axles employed on a variety of trucks which are design to two over-the-road trailers. Lugs shall refer to the threaded studs which receive a wheel and a lug nut or other retention device to secure a wheel onto a drive train of a truck, bus or car.

Mounted wheel assemblies fail in generally two modes: bearing failure and lug assembly failure. In the first mode, when a wheel bearing fails, the components of the assembly shift off center, and it generally causes enough torque, heat and abrasion that the spindle nut system fails, so the wheels and tires with the still-attached hub and brake system, fly free of the axle assembly as a sub-assembly, often at a high rate of speed. In the second mode of failure, one or more lug bolts and/or lug nuts fail, such as snapping off or thread stripping from over-torqueing, which leads to excessive force on the remaining lug bolts and nuts. Those remaining lug bolts and nuts then fail due to overstress, and the wheel and tire combination flies free of the axle and the rest of the mounted wheel assembly components. In either mode of failure, combining the speed with the weight of the break-away wheels, tires and sub-assembly, which can weigh as much as 700 pounds, a very dangerous projectile is now loose and out of control. It can travel a great distance before stopping, causing considerably property damage, as well as injury and death to people and livestock.

The foregoing descriptions of wheel mounting failure scenarios are provided for general reference only, and represent the functional components of a typical axle, hub and wheel system. In actual products, numbers of components, sizes, order of assembly, and component names may vary to some degree, while still being represented by the generalizations of these figures.

SUMMARY DISCLOSURE OF THE INVENTION

A wheel restraint system is disclosed and illustrated which is especially useful for restraining break-away wheels on drive axles and also to trailer axles, having a tether, a cable end component, a thrust bearing, and a wheel retention subassembly which fits over a wheel hub, wherein the tether is secured to the vehicle, such as secured to the inside wall of a hollow axle or through a hollow axle to an opposing similar wheel restraint system.

BRIEF DESCRIPTION OF THE DRAWINGS

The description set forth herein is illustrated by the several drawings, which are not necessarily drawn to mechanical scale.

Figure 8:
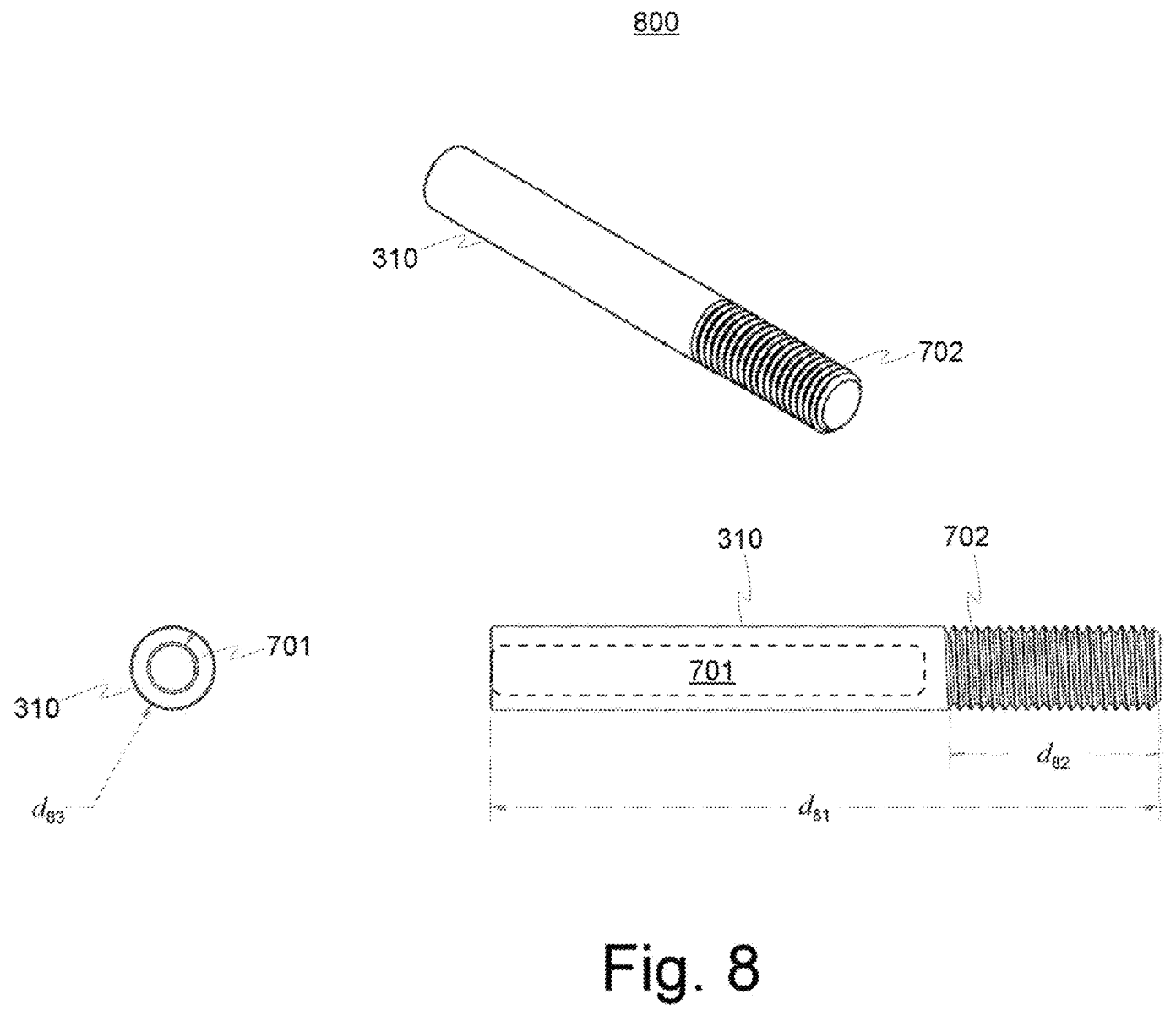

FIG. 8 provides details according to at least one embodiment of the present invention of a cable end component.

DETAILED DESCRIPTION OF EMBODIMENT(S) OF THE INVENTION

Figure 1:
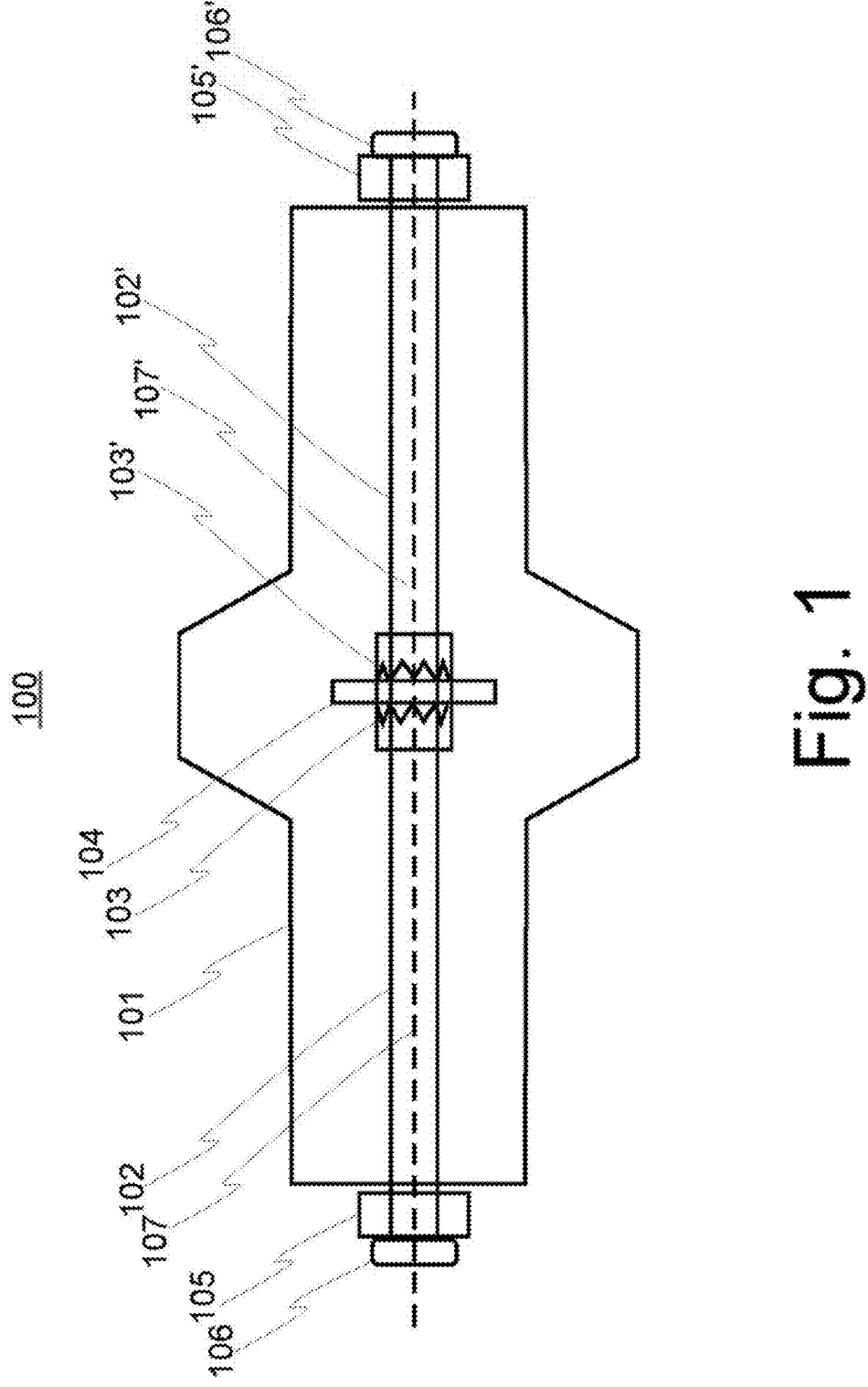
FIG. 1 provides a schematic (functional) diagram according to at least one embodiment of the present invention.

The inventor of the present invention has recognized a problem in the art not previously recognized or addressed regarding prevention of run-away, break-away or fly-away semi-trailer truck wheels. The present inventor has recognized that some run-away, break-away or fly-away truck wheels are due bearing failures are difficult to prevent, and that existing technologies on the market are insufficient and/or ineffective for a number of reasons.

The present inventor filed U.S. patent application Ser. No. 16/514,187 on Jul. 17, 2019, to address this unmet need in the art for wheels mounted to towed trailers, which disclosed a tether system which is disposed through the hollow core of a truck trailer axle and which is connected through one or more swivel bearings to specialized hardware on both ends of the axle. In this manner, when a bearing fails, the wheel assembly may collapse under the axle, but is otherwise prevented from departing at a high speed away from the trailer. From this patent application and a continuation-in-part patent application, two U.S. patents have issued, namely U.S. Pat. No. 10,987,973 on Jun. 5, 2019, and U.S. Pat. No. 11,084,324 on Aug. 10, 2021, respectively, both by William Turner.

Still further innovations and improvements for this field of safety technology have been disclosed and illustrated by William Turner in a pending U.S. Patent Application published as U.S. 2021/0347202 A1 on Nov. 11, 2021. The reader is referred to these publicly-available documents for pertinent background terminology and concepts.

The present inventor has further realized that, while these related inventions are very useful for preventing a percentage of run-away trailer wheels, it does not fully address a need in the art regarding wheels which come loose from the drive axles of the trucks which may be pulling those trailers (or which may not be pulling a trailer).

The present invention will be disclosed in a manner which uses a hollow drive axle or half-axle as the example environment, in conjunction with an improvement of the related wheel tether inventions. However, it will also be readily understood by those having ordinary skill in the art that the present invention is equally useful and effective in meeting its objectives when used without such a through-axle tether, on solid axles, and on other wheel mounts which do not have axles, such as solid-axle trailers, truck front wheels, and truck drive wheels.

Therefore, the following structures are disclosed which are exemplary of the invention which is inexpensive, effective, and readily installed on existing wheel assemblies. While certain components and certain dimensions and specifications may be disclosed, it will be recognized by those skilled in the art that certain substitutions may be made without departing from the spirit and scope of the present invention. For example, all components are preferably design to withstand a force of at least 24,000 pounds for embodiments which are to be used with a long-haul over-the-road (OTC) trailer hauling systems in North America, but may be designed to withstand different forces for smaller trucks, buses, vehicles, etc.

Turning to FIG. 1, a schematic (functional) diagram according to at least one embodiment of the present invention is shown 100. A drive axle housing 101 encloses a ring gear 104 which is driven by a drive shaft (not shown) from an engine to turn two half-axles 102 and 102' via engagement between the ring gear 104 and a pair of axle splines 103 and 103'. The engine's rotational energy is transmitted from the drive shaft, through the ring gear, through axle splines, down each half-axle to truck hubs 105 and 105' onto which wheels are bolted via lugs and lug nuts. Spline drive flanges 106 and 106' are mounted at the end of each half-axle. In general, embodiments of the present invention will provide one or more wheel retention tethers 107 and 107' within a hollow core of the half-axle's, as shown by the dashed line without interfering with the drive mechanism 104, 103, and 103'.

Figure 2:
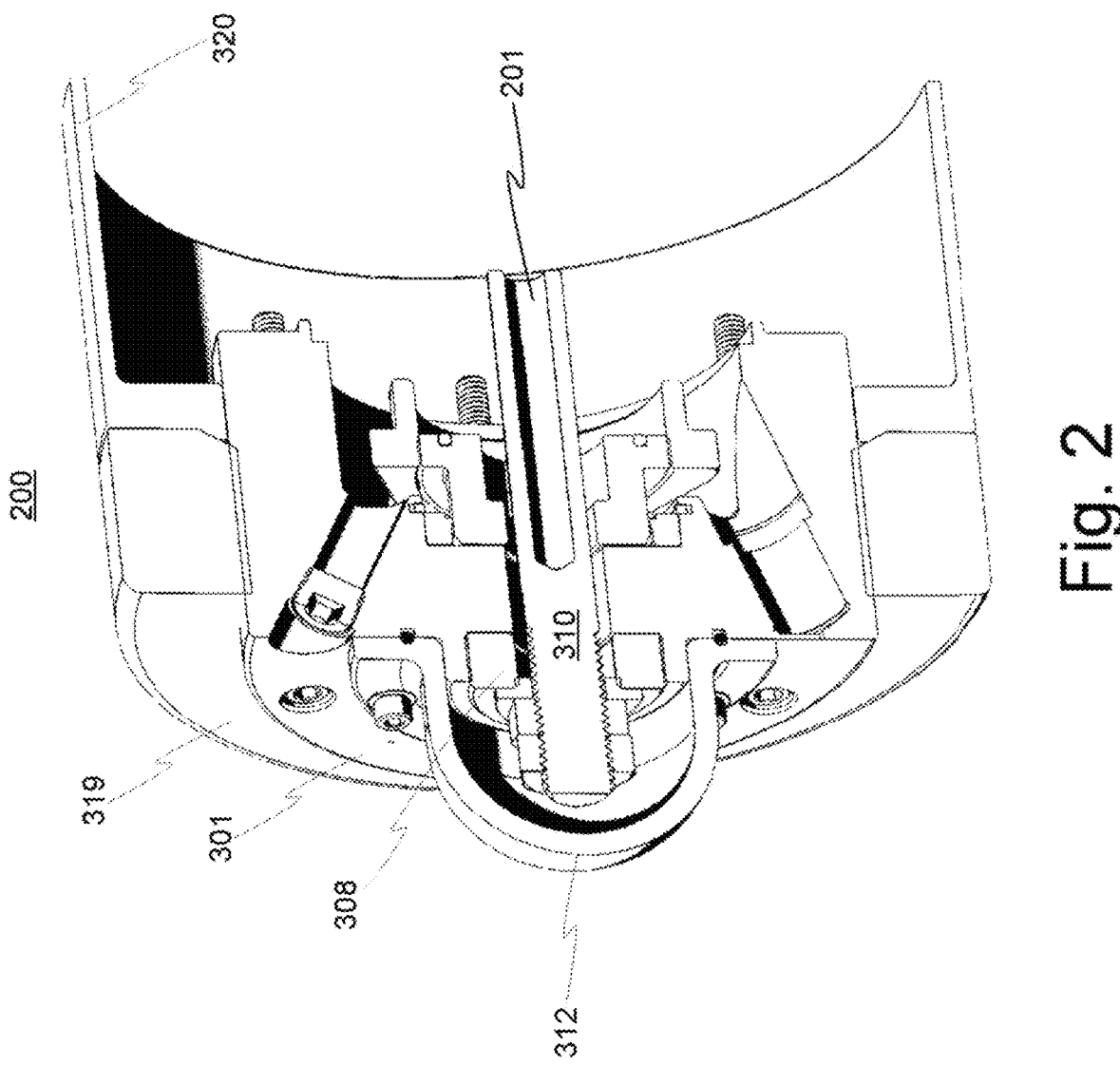
FIG. 2 illustrates a cut-away view according to at least one embodiment of the present invention, taken from a vertical plane through the center of the generally coaxial assembly.

Referring now to FIG. 2, a cut-away view according to at least one embodiment of the present invention is shown 200, taken from a vertical plane through the center of the generally coaxial assembly. The larger components of the example embodiment are labeled in this view, while the smaller components are shown but not labeled for the purposes of clarity. Subsequent figures will provide more details of the smaller components. Shown in FIG. 2 are a cable end component 310 having a means 201 for receiving an end of a cable such as a cavity suitable for receiving an end of a section of wire rope and being crimped to retain the wire rope. Other cable attachment means may also be used which are known in the art for retaining ends of wire rope, steel cable, cords, chains, and the like. In this example embodiment, the cable end component 310 is provided with a threaded end to receive one or more fasteners, to be described in more detail in the subsequent paragraphs. Other forms for retention, such as a cotter pins, may be suitable in other embodiments.

The cable end component 310 is retained into a coaxial assembly including thrust bearing 308, a tethered hub 301, a wheel retainer nut 319 and a wheal retainer 320 that ultimately is passed over the typical drive wheel of a truck. In this manner, the thrust bearing provides rotational decoupling between the tether cable (received 201 into the cable end 310) and the wheel, while providing retention force (stretching force on the tether cable) when the wheel separates from the drive axle. A dust cover 312 provides protection of and access to the fastening means for the cable end component 310.

Other embodiments according to the present invention may use more or fewer parts, and may re-arrange the sequence of parts, however the core components of a tether end and a bearing will be in most embodiments in one form or another. This arrangement of components in which a thrust bearing is positioned in and incorporated into a wheel-retaining bell assembly allows for replacement of the swivel provided in the related patents and patent applications. As such, this general arrangement of components is also suitable, with appropriate adaptations, for use on trailer axles as well. In some embodiments, thrust bearings and swivels may be used in combination.

Figure 3:
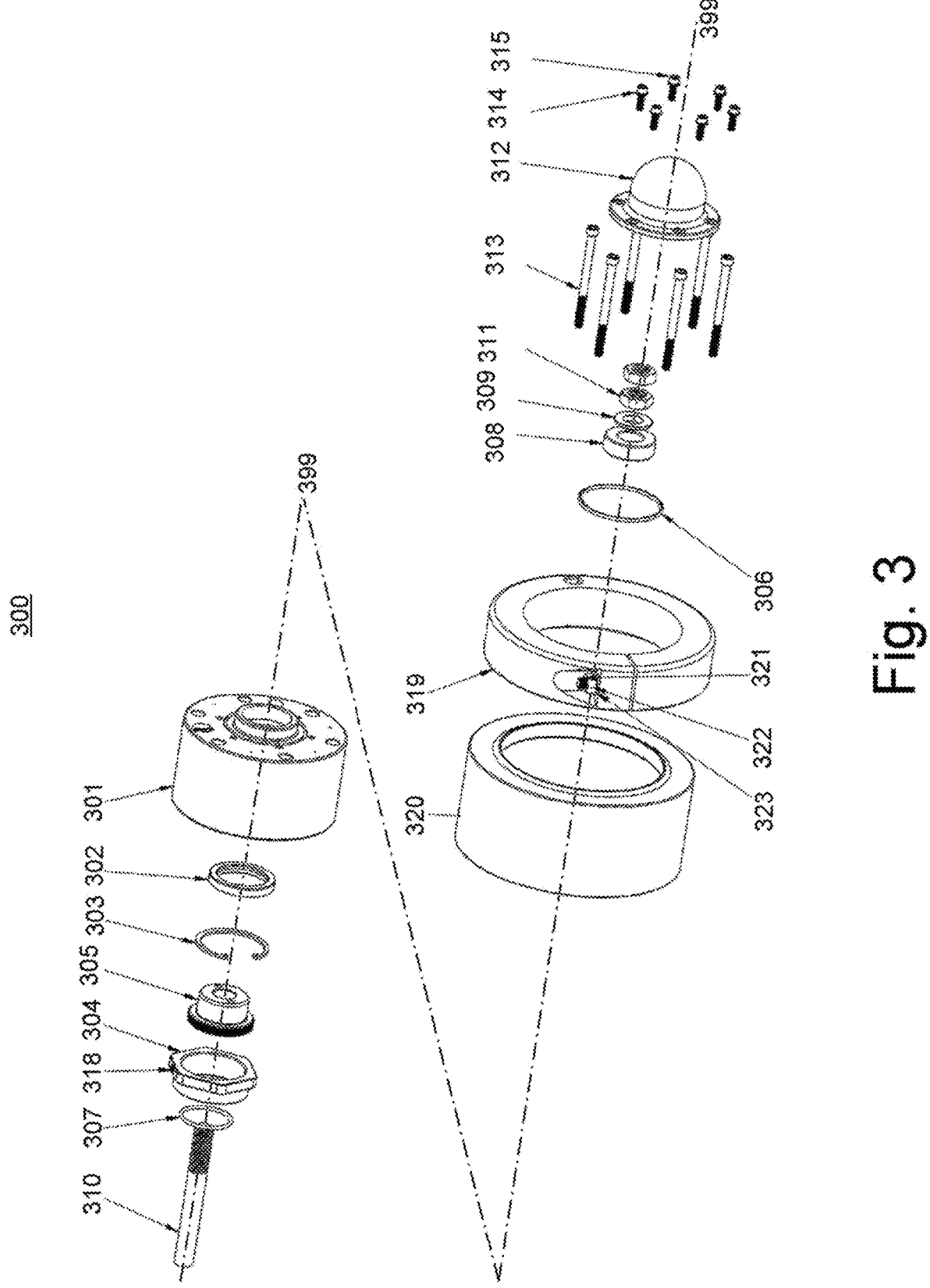
FIG. 3 shows an exploded diagram according to at least one embodiment of the present invention in which the components are generally coaxially aligned with each other.
Figure 4:
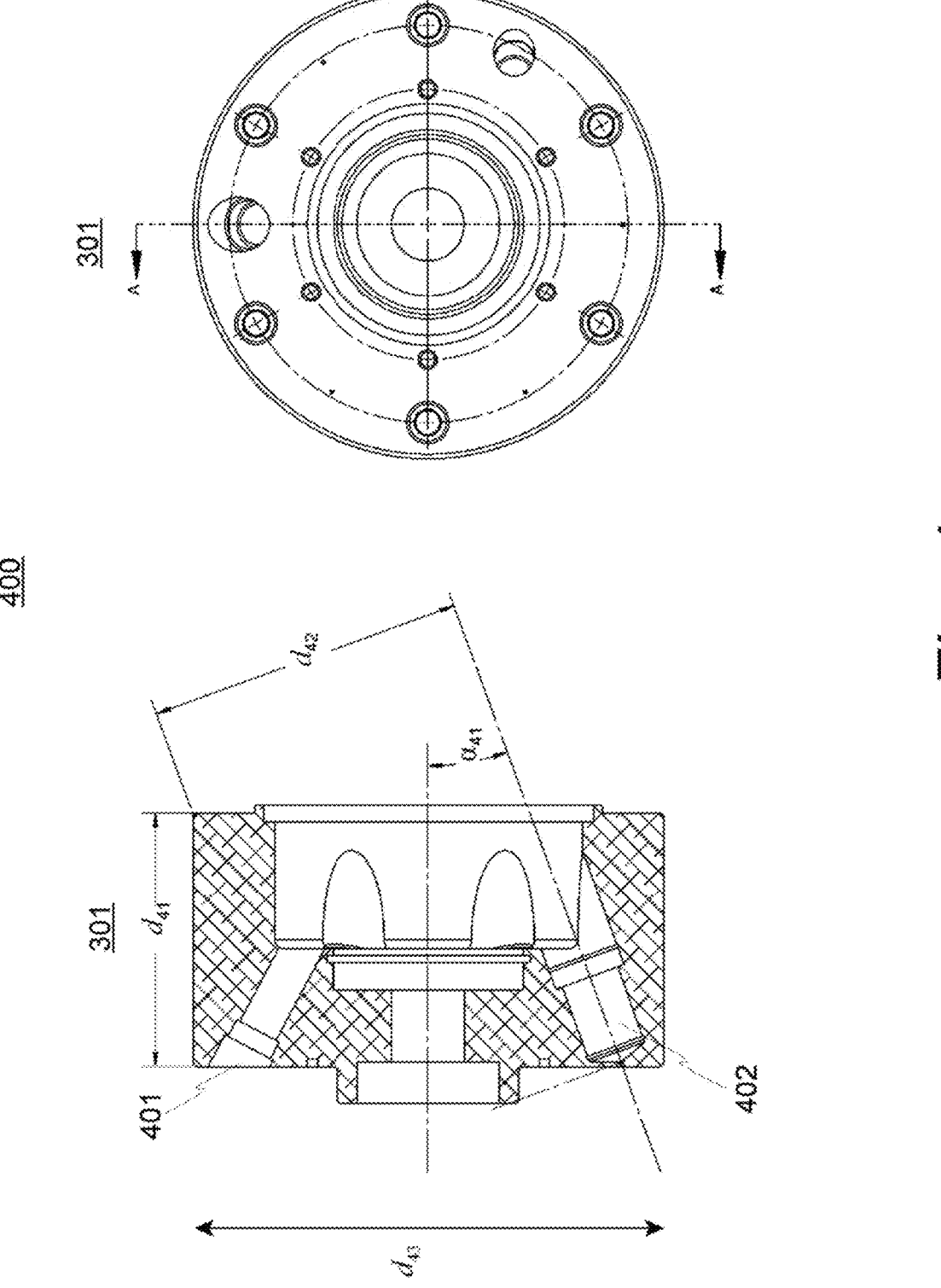
FIG. 4 provides details according to at least one embodiment of the present invention of a hub.
Figure 5:
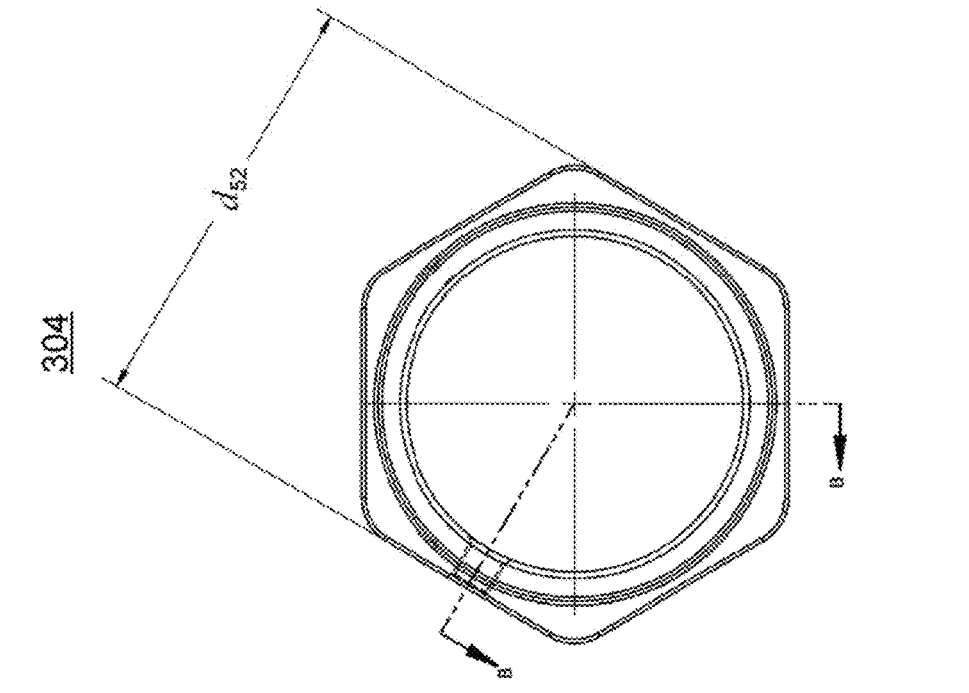
FIG. 5 provides details according to at least one embodiment of the present invention of a retaining nut.
Figure 5:
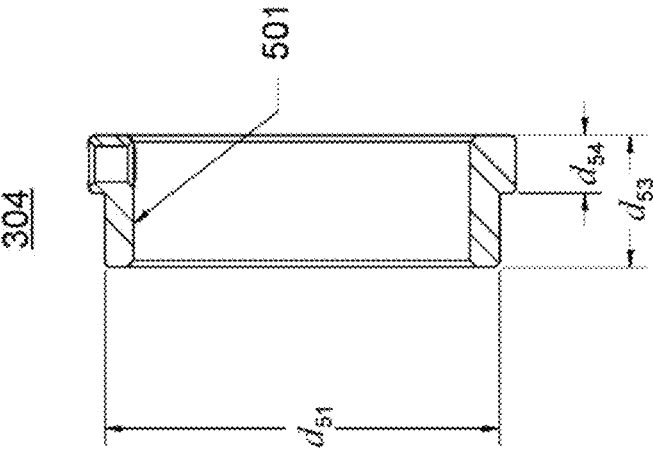
Figure 6:
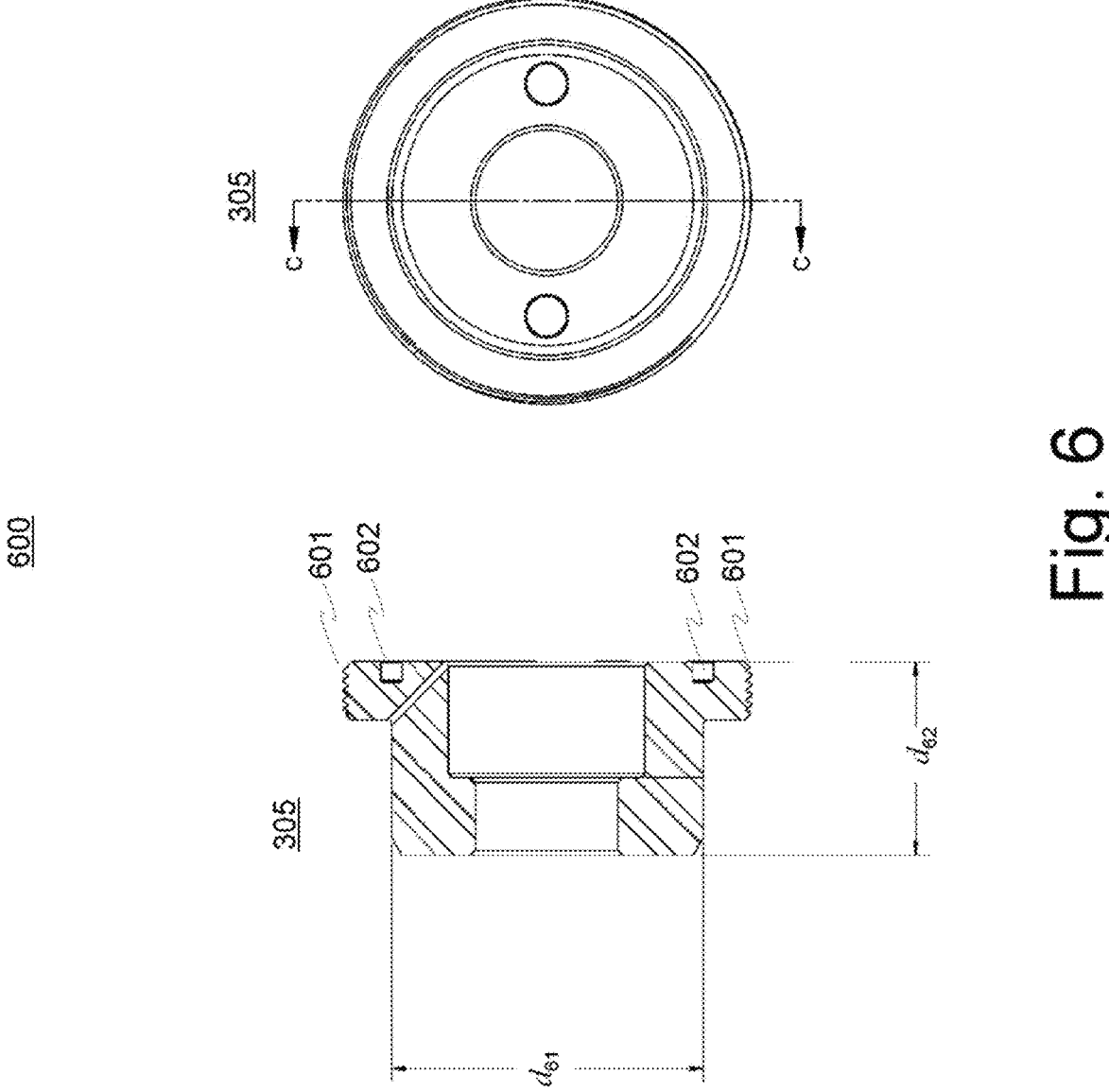
FIG. 6 provides details according to at least one embodiment of the present invention of a stop and seal nut.
Figure 7:
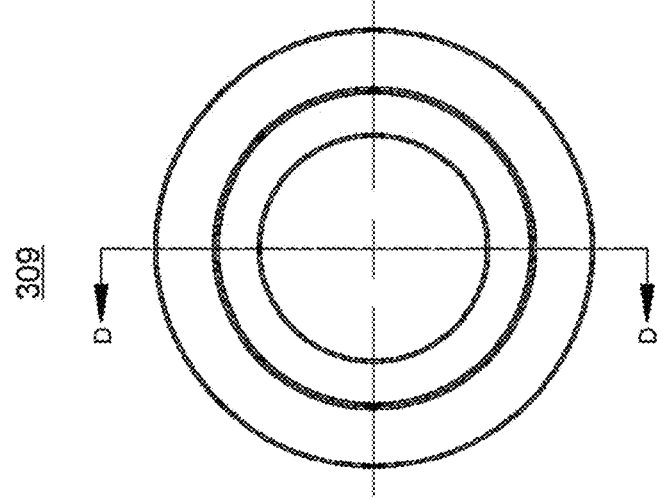
FIG. 7 provides details according to at least one embodiment of the present invention of an alignment washer.
Figure 7:
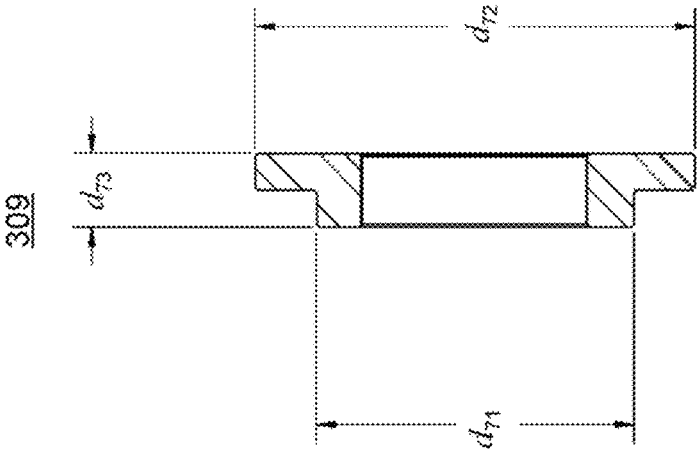
Figure 9:
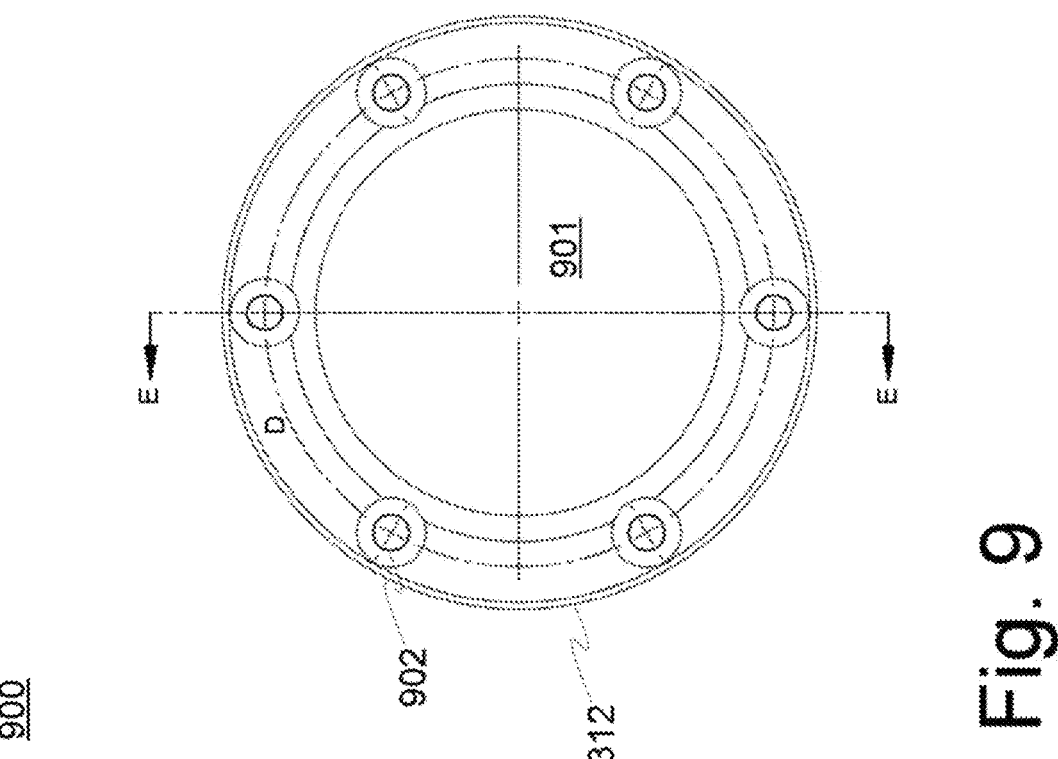
FIG. 9 provides details according to at least one embodiment of the present invention of a dust cover.
Figure 9:
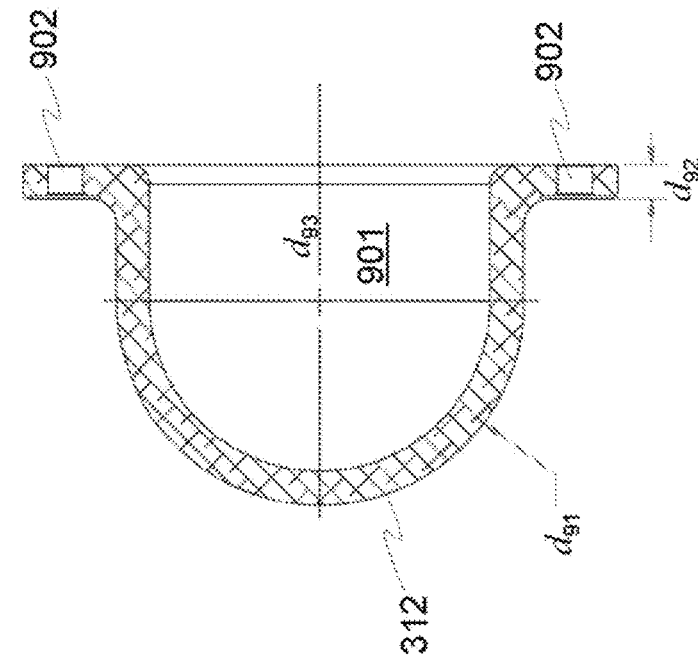
Figure 10:
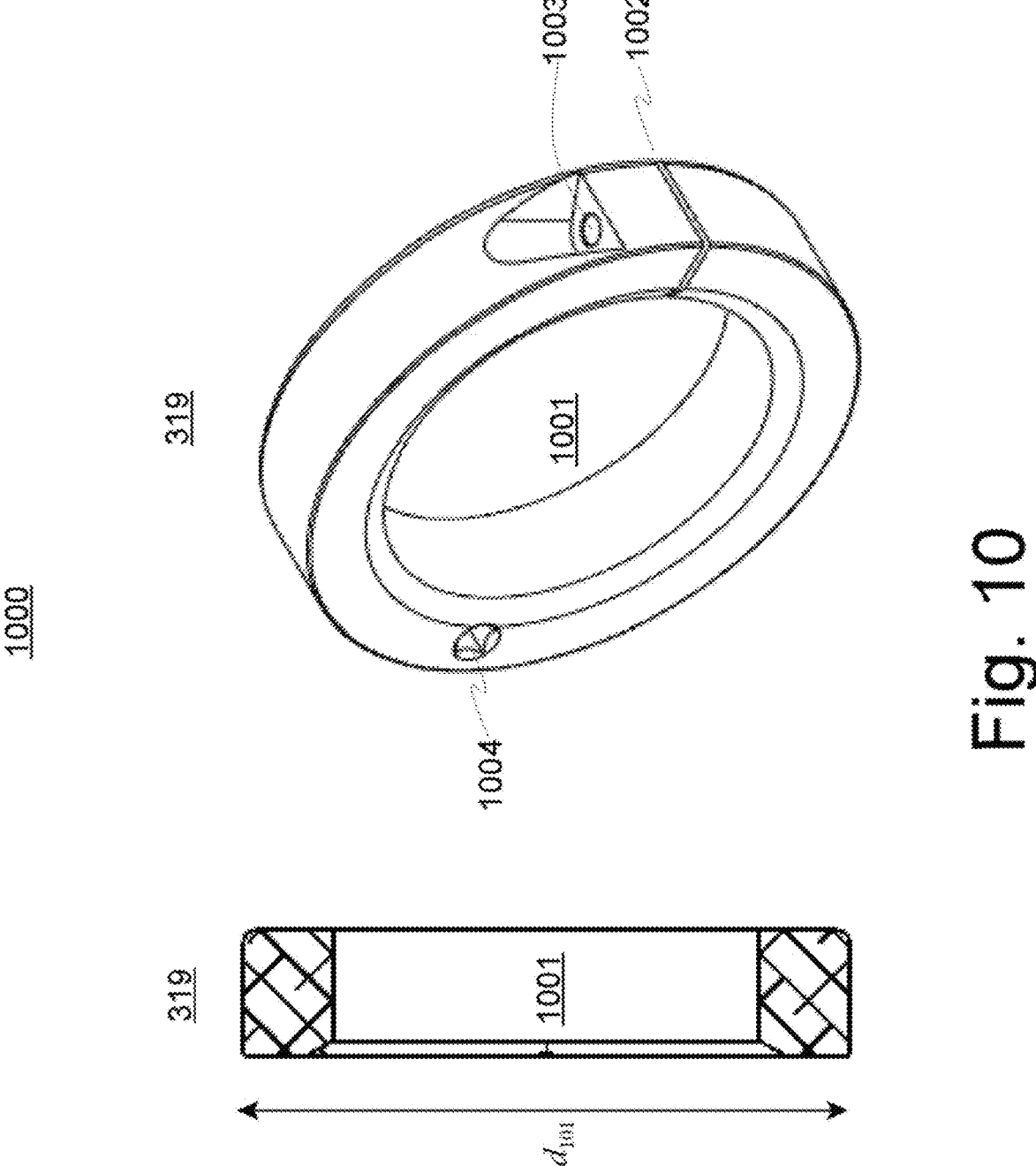
FIG. 10 provides details according to at least one embodiment of the present invention of a wheel retainer nut.
Figure 11:
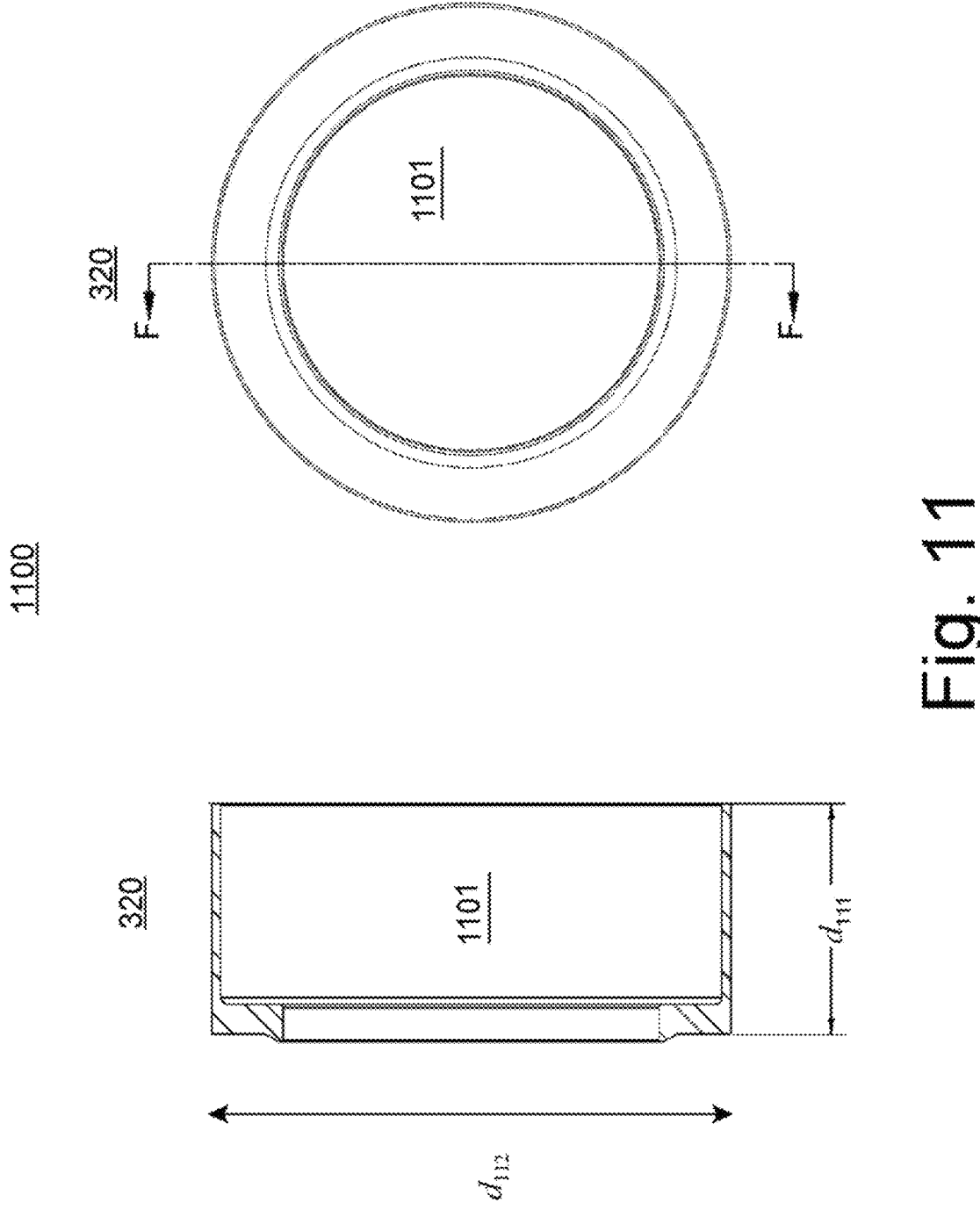
FIG. 11 provides details according to at least one embodiment of the present invention of a wheel retainer.

Turning now to FIG. 3, an exploded diagram 300 according to at least one embodiment of the present invention is shown, coaxially aligned on the dot-dash line 399 with each other, except where shown differently. Many of the components are provided to ensure a seal to retain lubrication of the wheel and wheel bearings. Traversing the assembly from left to right, this embodiment provides, in detail, the following components:

(a) hub 301, example material Xylan 1514, as shown in more detail in FIG. 4;

(b) pressure seal 302, such as part number X630947 from BAL SEAL, made of SP191 HT;

(c) retaining ring 303, such as part number 99142A630 available from McMaster Carr, made of steel with a Black OXide finish;

(d) retaining nut 304 made of 4140 HT 110 MY with a Xylan 1620-870 finish, as shown in more detail in FIG. 5;

(e) stop and seal nut 305 made of 4140 HT 110MY with a Xylan 1620-870 finish, as shown in more detail in FIG. 6;

(f) a-ring 306, such as part number 9452K164 available from McMaster Carr made of Buna-N NBR Rubber;

(g) a-ring 307, such as part number 9452K960 available from McMaster Carr made of Buna-N NBR;

(h) thrust bearing 308 such as part number 4462-00 available from Motion Industries made of 52100;

(i) alignment washer 309 made of 1018 ASTM A108 with a Xylan 1620-870 finish, as shown in more detail in FIG. 7;

(j) cable end component 310 made of 1018, ASTM A108, as shown in more detail in FIG. 8;

(k) jam nut 311 such as part number 93839A837 available from McMaster Carr made of steel with a zinc finish;

(l) dust cover 312 made of 6061 T6 with a Xylan 1514 finish, as shown in more detail in FIG. 9;

(m) socket head cap screw 313 such as part number 90128A599 available from McMaster Carr made of steel with a zinc finish;

(n) washer 314 such as part number 90945A760 available from McMaster Carr made of steel with a zinc finish;

(o) socket head cap screw 315 such as part number 90128A245 available from McMaster Carr made of steel with a zinc finish;

(p) pipe plug (not shown) such as part number 446051<232 available from McMaster Carr made of steel;

(q) pipe plug (not shown) such as part number 446051<233 available from McMaster Carr made of steel;

(r) socket set screw 318 such as part number 94105A588 available from McMaster Carr made of steel with a black oxide finish;

(s) wheel retainer nut 319 made of 6061 T-6 with a Xylan 1514 finish, as shown in more detail in FIG. 10;

(t) wheel retainer 320 made from 1026 Tube and A519/ A106 with a Xylan 1514 finish, as shown in more detail in FIG. 11;

(t) stud 321 available from J&E Supply made of steel with a zinc finish;

(u) hex nut 322 such as part number 94895A820 available from McMaster Carr made of steel with a zinc finish; and (v) flat washer 323 such as part number 90126A032 available from McMaster Carr made of steel with a zinc finish.

Other embodiments may utilize other components, other materials, other finishes, and may integrate or combine some components or may separate elements of components into separate components.

Referring now to FIG. 4, more details of a hub 301 according to at least one embodiment of the present invention are shown 400. The rightmost diagram shows the hub 301 from a frontal perspective, while the leftmost diagram shows the hub 301 in a side cutaway view taken along line A. In this example embodiment, an optional access port 401 for introducing lubrication to the assembly is shown, with a balancing void 402, provided at an angle $\alpha_{41}$ from the center line (dot-dash line). This example hub 301 has a depth $d_{41}$ of about 3.5", about 4.37" in diameter $d_{43}$, and the lubrication port 401 and void 402 are positioned $d_{42}$ about 4.37" from the outer edge. according to at least one embodiment of the present invention, the hub 301 is provided with a finish from Jet Hot Coatings of Xylan 1514 Organic Solvent Enamel, which is low friction and stain resistant with a high UV rating, at a thickness of 0.5-1 mil. Other dimensions and angles as well as other materials and finishes may be implemented in other embodiments.

Turning to FIG. 5, more details of a retaining nut 304 according to at least one embodiment of the present invention are shown 500. The rightmost diagram shows the retaining nut 304 from a frontal perspective, while the leftmost diagram shows the example retaining nut 304 in a cutaway view taken along line B. This example embodiment is about 3.0" in diameter $d_{51}$ for the taller round portion, with a 3.245" diameter $d_{52}$ for the faceted shoulder portion, and a thread disposed inside the round portion to mate with the stop and seal nut 305. The thickness $d_{53}$ of this example is 1.8" for the round portion, and about $d_{54}$ 0.438" for the faceted portion. Corners and edges may be rounded.

Referring now to FIG. 6, more details of a stop and seal nut 305 are shown according to at least one embodiment of the present invention. The rightmost diagram shows the stop and seal nut 305 from a frontal perspective, while the leftmost diagram shows the example stop and seal nut 305 in a cutaway view taken along line C. As previously mentioned, this embodiment is provided with threads 601 to mate with the inside of the retaining nut 304. The outer diameter $d_{61}$ is about 2" main body, which is about 1.25" thick $d_{62}$. The stop and seal nut 305 according to at least one embodiment of the present invention is provided with a groove or seat 602 for receiving the o-ring 307.

Shown 700 in FIG. 7 is an example embodiment of an alignment washer 309 according to at least one embodiment of the present invention. The rightmost diagram shows the alignment washer 309 from a frontal perspective, while the leftmost diagram shows the example alignment washer 309 in a cutaway view taken along line D. This particular example embodiment has an outside diameter $d_{72}$ of 1.49" with a diameter $d_{71}$ of the inner body of 1.075", and a thickness $d_{73}$ of 0.25".

FIG. 8 shows 800 more details of a cable end component 310 according to at least one embodiment of the present invention. The topmost diagram shows the example cable end component 310 from a perspective view, the leftmost diagram shows the cable end component 310 from the end into which the cable (tether) is received into an internal void 701, and the rightmost diagram shows the cable end component 310 from a side perspective. In this example embodiment, the length $d_{81}$ of the cable end 310 is 6" with a threaded portion 702 having a length $d_{82}$ of 1.875", and the outside diameter $d_{83}$ is 0.75".

Referring now to FIG. 9, an example embodiment according to at least one embodiment of the present invention of a dust cover 312 is shown 900. The rightmost diagram shows the dust cover 312 from a frontal perspective, while the leftmost diagram shows the example dust cover 312 in a cutaway view taken along line E. This example dust cover 312 is constructed of rigid material having a thickness $d_{92}$ of 0.25" and a half-dome shape with a radius $d_{91}$ of 1.5" centered $d_{92}$ from the mounting flange at 1.0", thus defining an interior volume 901 in which the threaded portion 702 of the cable end component 310 and its associated fasteners are received and protected. Mounting holes 902 are provided around the flange.

FIG. 10 illustrates more details of a wheel retainer nut 319 according to at least one embodiment of the present invention. The rightmost diagram shows the example wheel retainer nut 319 from a perspective view, and the leftmost diagram shows a vertical cutaway perspective of the wheel retainer nut 319 in which the interior volume 1001 is clearly seen for fitting over and receiving the wheel retainer 320. This particular example embodiment of a wheel retainer nut 319 acts like a split ring in which a small gap 1002 is provided with a tightening fastener hole 1003 for receiving a bolt which, when tightened, close the gap and provides a compression fit. In the example embodiment, the fastener hole is provided with a stud 321, hex nut 322, and flat washer 323, as shown in the other figures. In this example embodiment, a recess or indentation 1004 is provided opposite from the tightening hardware 321, 322 and 323. This recess is shaped to receive a square drive head of a ratchet wrench which can be used to hold the wheel retainer nut 319 from spinning as the tightening hardware is tightened or loosened. In the example embodiment, the diameter $d_{101}$ of the wheel retainer nut 319 is about 6".

FIG. 11 shows 1100 more details of a wheel retainer 320 according to at least one embodiment of the present invention. The rightmost diagram shows the example wheel retainer 320 from a front perspective view, and the leftmost diagram shows a vertical cutaway along plane F in which the interior volume 1101 is clearly seen for fitting over and receiving the wheel retainer 320. The example wheel retainer 320 has a thickness $d_{111}$ of about 4", a diameter $d_{112}$ of about 6", and defines an interior volume 1101 to receive the tethered hub 301, as shown in other figures.

Figure 12:
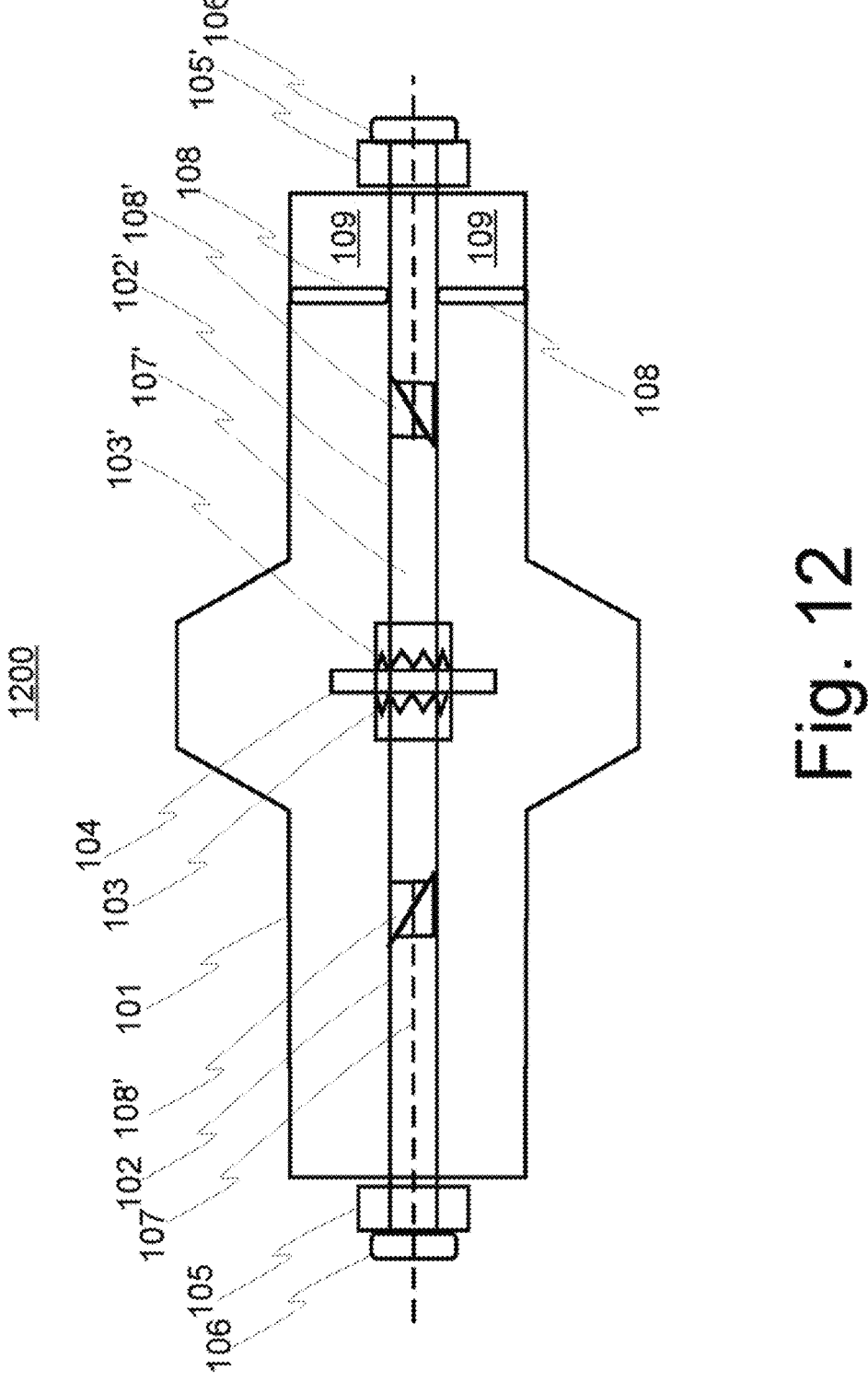
FIG. 12 provides a schematic (functional) diagram according to at least an alternate embodiment of the present invention.

In some embodiments, the ring gear 104 may have a hole in the middle of it aligned with the void in the hollow axle 102, thereby allowing a single tether 107-107' to extend from one tethered hub to the other tethered hub, as shown in FIG. 1. However, in some embodiments, the ring gear 104 may not provide this opportunity for a pass-through, so internal anchors 108, 108' may be utilized to hold the non-wheel end of a shorter tether may be used, as shown 1200 in FIG. 12. There are a variety of available suitable devices, such as expanding anchors for rock and concrete, which provide an expanded diameter of suitable size, such as approximately 2", and which are designed to increase their expansion force upon pulling on the tether. Some such expanding anchors have two opposing half cylinders which are shaped into wedges, others have a conical interior element that expands an exterior element, etc.

Rotary Seal Embodiment

In at least one embodiment, a rotary air seal 108 is provided between an axle shaft 102' and an axle housing 101 which creates an air chamber 109. Through this air chamber, the improved hub and tethering system can transfer pressurized air to the hub end then out through a flexible hose to the wheel and tires for inflation of the tires. In this embodiment, trucks which have automatic inflation systems can also be equipped with the safety improvements of the present invention. There are a variety of rotary seals available on the market for this purpose, including but not limited to seals designed and sold by Bal Seal Engineering, Inc., of Foothill Ranch, California, USA.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. An apparatus for restraining at least a first wheel assembly and a second wheel assembly mounted on an axle assembly wherein the axle assembly comprises an axle body with a first end, a second end, and a passage extending through the axle body from the first end to the second end, a first hub rotatably mounted on the first end of the axle body, and a second hub rotatably mounted on the second end of the axle body, the first wheel assembly mountable on the first hub and the second wheel assembly mountable on the second hub, the apparatus comprising:

a first hub member coaxially connectable to the first hub and having threads extending along an outer periphery thereof;

a first wheel retainer having an annular rim and positionable over the first hub member so the annular rim of the first wheel retainer is engageable with the first wheel assembly when the first wheel assembly is mounted on the first hub;

a first wheel retaining nut threadingly engaged with the threads of the first hub member so the first wheel retainer is securable between the first wheel assembly and the first retaining nut;

a second hub member coaxially connectable to the second hub and having threads extending along an outer periphery thereof;

a second wheel retainer having an annular rim and positionable over the second hub member so the annular rim of the second wheel retainer is engageable with the second wheel assembly when the second wheel assembly is mounted on the second hub;

a second wheel retaining nut threadingly engaged with the threads of the second hub member so the second wheel retainer is secured between the second wheel assembly and the second retaining nut; and a tether assembly extendible through the passage of the axle body and having a flexible cable having a first end and a second end, a first cable end component attached to the first end of the cable, and a second cable end component attached to the second end of the cable, the first cable end component connected to the first hub member so the first hub member is rotatable relative to the first cable end component and the second cable end component connected to the second hub member so the second hub member is rotatable relative to the second cable end component and the second hub member is interconnected to the first hub member.

2. The apparatus of claim 1, wherein the first cable end component is slidably and sealingly connectable to the axle body and sealingly connected to the first hub member, and wherein the second cable end component is slidably and sealingly connectable to the axle body and sealingly connected to the second hub member.

3. The apparatus of claim 1, wherein the first wheel retaining nut comprises:

a split-ring; and at least one fastener securing the split ring together thereby securing the first wheel retaining nut to the first hub member.

4. The apparatus of claim 3, wherein the second wheel retaining nut comprises:

a split-ring; and at least one fastener securing the split-ring together thereby securing the second wheel retaining nut to the second hub member.

5. An axle assembly, comprising an axle body with a first end, a second end, and a passage extending through the axle body from the first end to the second end;

a first hub rotatably mounted on the first end of the axle body, a first wheel assembly mountable on the first hub;

a second hub rotatably mounted on the second end of the axle body, a second wheel assembly mountable on the second hub;

a first hub member coaxially connected to the first hub and having threads extending along an outer periphery thereof;

a first wheel retainer having an annular rim and positionable over the first hub member so the annular rim of the first wheel retainer is engaged with the first wheel assembly when the first wheel assembly is mounted on the first hub;

a first wheel retaining nut threadingly engaged with the threads of the first hub member so the first wheel retainer is secured between the first wheel assembly and the first retaining nut;

a second hub member coaxially connected to the hub of the second wheel end assembly and having threads extending along an outer periphery thereof;

a second wheel retainer having an annular rim and positionable over the second hub member so the annular rim of the second wheel retainer is engaged with the second wheel assembly when the second wheel assembly is mounted on the second hub;

a second wheel retaining nut threadingly engaged with the threads of the second hub member so the second wheel retainer is secured between the second wheel assembly and the second retaining nut; and a tether assembly extending through the passage of the axle body and comprising a flexible cable with a first end and a second end, a first cable end component attached to the first end of the cable, and a second cable end component attached to the second end of the cable, the first cable end component connected to the first hub member so the first hub member is rotatable relative to the first cable end component and the second cable end component connected to the second hub member so the second hub member is rotatable relative to the second cable end component and the second hub member is interconnected to the first hub member.

6. The axle assembly of claim 5, wherein the first cable end component is slidably and sealingly connected to the axle body and sealingly connected to the first hub member, and wherein the second cable end component is slidably and sealingly connected to the axle body and sealingly connected to the second hub member.

7. The axle assembly of claim 5, wherein the first wheel retaining nut comprises:

a split-ring; and at least one fastener securing the split-ring together thereby securing the first wheel retaining nut to the first hub member.

8. The axle assembly of claim 7, wherein the second wheel retaining nut comprises:

a split-ring; and at least one fastener securing the split-ring together thereby securing the second wheel retaining nut to the second hub member.

9. The axle assembly of claim 5, further comprising a first dust cover connected to the first hub member and a second dust cover connected to the second hub member.

10. A method of restraining a first wheel assembly and a second wheel assembly mounted on an axle assembly wherein the axle assembly comprises an axle body with a first end, a second end, and a passage extending through the axle body from the first end to the second end, a first hub rotatably mounted on the first end of the axle body, and a second hub rotatably mounted on the second end of the axle body, the first wheel assembly mounted on the first hub and the second wheel assembly mounted on the second hub, the method comprising:

connecting a first hub member coaxially to the first hub;

securing a first wheel retainer having an annular rim to the first hub member so the annular rim of the first wheel retainer is engaged with the first wheel assembly;

connecting a second hub member coaxially to the second hub; and securing a second wheel retainer having an annular rim to the second hub member so the annular rim of the second wheel retainer is engaged with the second wheel assembly; and extending a tether assembly through the passage of the axle body, the tether assembly comprising a flexible cable having a first end and a second end, a first cable end component attached to the first end of the cable, and a second cable end component attached to the second end of the cable;

connecting the first cable end component to the first hub member so the first hub member is rotatable relative to the first cable end component; and connecting the second cable end component to the second hub member so the second hub member is rotatable relative to the second cable end component and the second hub member is interconnected to the first hub member.

11. The method of claim 10, wherein the step of securing the first wheel retainer comprises:

positioning the first wheel retainer over the first hub member so the annular rim of the first wheel retainer is engaged with the first wheel assembly, the first hub having threads extending along an outer periphery thereof; and threadingly engaging a first wheel retaining nut with the threads of the first hub member so the first wheel retainer is secured between the first wheel assembly and the first retaining nut.

12. The method of claim 11, wherein the first wheel retaining nut comprises a split-ring and wherein the step of threadingly engaging the first wheel retaining nut further comprises securing the split-ring together thereby securing the first wheel retaining nut to the first hub member.

13. The method of claim 12, wherein the step of securing the second wheel retainer comprises:

positioning the second wheel retainer over the second hub member so the annular rim of the second wheel retainer is engaged with the second wheel assembly, the second hub having threads extending along an outer periphery thereof; and threadingly engaging a second wheel retaining nut with the threads of the second hub member so the second wheel retainer is secured between the second wheel assembly and the second retaining nut.

14. The method of claim 13, wherein the second wheel retaining nut comprises a split-ring and wherein the step of threadingly engaging the second wheel retaining nut further comprises securing the split-ring together thereby securing the second wheel retaining nut to the second hub member.

15. The method of claim 10, further comprising:

slidably and sealingly connecting the first cable end component to the axle body and sealingly connecting the first cable end component to the first hub member; and slidably and sealingly connecting the second cable end component to the axle body and sealingly connecting the second cable end component to the second hub member.

* * * * *